UNITED STATES PATENT OFFICE.

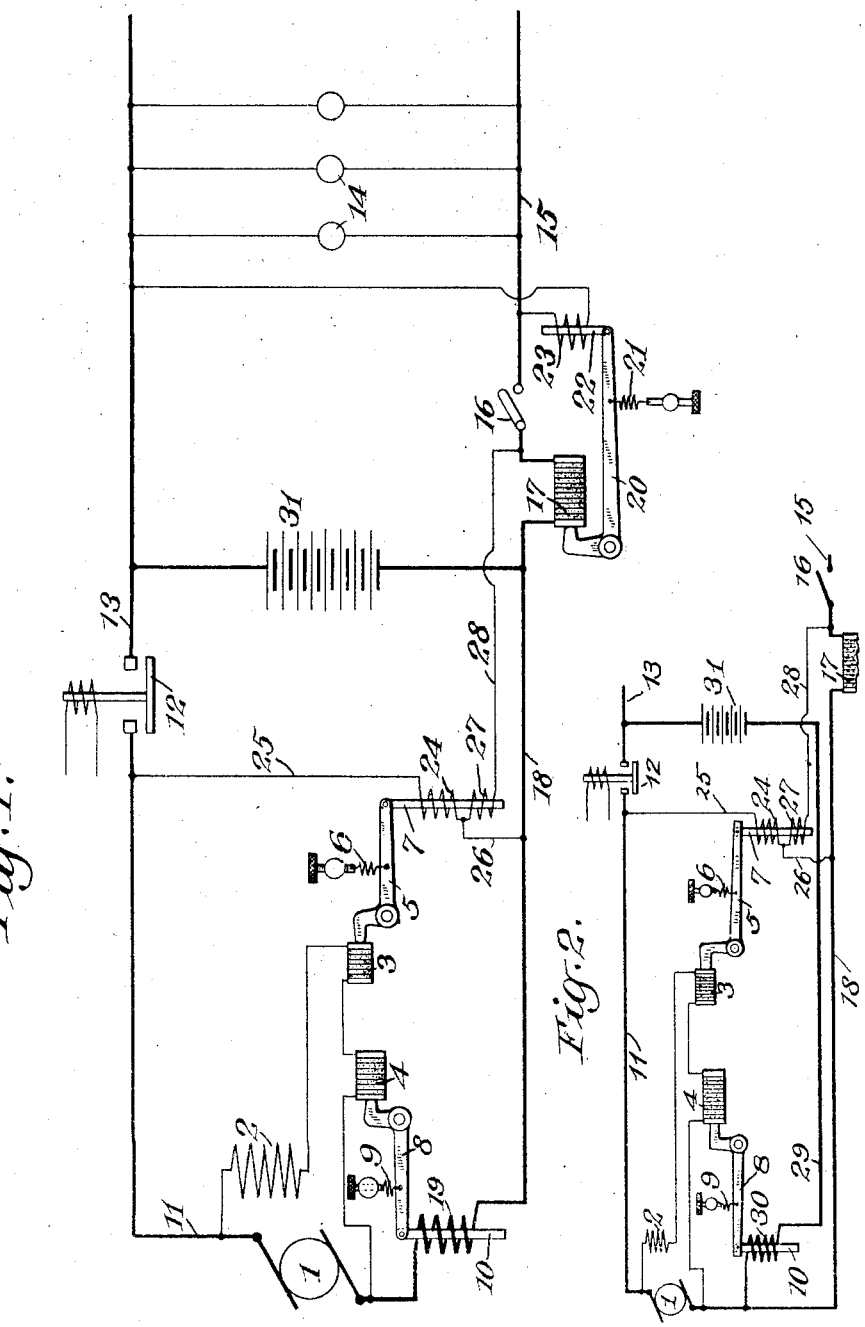

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,004,379.  Specification of Letters Patent.  Patented Sept. 26, 1911.

Application filed April 13, 1911. Serial No. 620,742.

*To all whom it may concern:*

Be it known that I, JOHN L. CREVELING, a resident of the city, county, and State of New York, have invented certain new and useful Improvements in Electric Regulation, as set forth in the annexed specification and drawing, forming a part thereof.

My invention pertains to that class of electric regulation wherein it is desired to automatically govern a generator in a predetermined manner.

My invention has for its particular object to provide means whereby the voltage of a generator will be automatically governed in accordance with the duty thereof.

Figure 1 represents one type of system embodying my invention. Fig. 2 represents a modified form of system embodying my invention.

In Fig. 1 of the drawing, 1 represents a dynamo or generator provided with the usual field coil 2 having in series therewith the variable resistances 3 and 4, in this instance indicated as of the carbon pile variety for sake of simplicity merely. The resistance 3 may be controlled by the lever 5 normally drawn in an upward direction as by the adjustable spring 6 tending to compress the carbons 3 and decrease the resistance thereof. The lever 5 is provided at one extremity with the core 7 and thus the resistance 3 may be controlled by movement of core 7. The resistance 4 is controlled by the lever 8 normally drawn in an upward direction as by the adjustable spring 9, and provided with a core 10 which, by its movement, may thus control the resistance 4. 11 represents a generator lead which for sake of example will be considered as the positive and is carried to one side of the automatic switch 12 which may be any of the well-known types adapted to complete circuit between the generator and the battery under proper conditions. The opposite side of this switch is connected with the lead 13 in communication with the positive side of the storage battery 31 and the positive side of the lamps or other translating devices indicated at 14. The translating devices have their negative terminals connected to the translating main 15 which is carried to one side of the translation circuit switch 16 connected with one end of the regulating device 17, in this instance indicated as a variable resistance of the carbon pile variety for sake of simplicity. The opposite end of the carbon pile 17 is connected with the lead 18 in communication with the negative side of the storage battery 31 and one end of the winding or solenoid 19, the opposite end of which is connected with the negative brush of the generator. The regulating element 17 is controlled by a lever 20 normally drawn in a downward direction as by adjustable spring 21, which tends to compress the carbons and lower the resistance thereof. The lever 20 is provided at one extremity with the core 22 of iron, or other magnetic material, surrounded by the coil 23 in shunt across the translating circuit as indicated. 24 is a fine winding, or coil, surrounding the core 7 in such manner that energization of the same tends to depress the lever 5 against the action of the spring 6 and increases the resistance 3. The coil 24 is placed in shunt across the generator circuit as by means of wires 25 and 26, or across that part of the system, the voltage of which it is desired to have control the resistance 3. The core 7 is also surrounded by a solenoid 27 in shunt across the resistance 17 as by wires 28 and 26. The coil 27 is so wound that as the resistance 17 is increased and the drop across the same increased, the current shunted around the resistance 17 through the winding 27 will assist the coil 24 in tending to overcome the spring 6 for a purpose that will hereinafter appear. The solenoid 19 surrounding the core 10 is so wound that energization of the same tends to depress the lever 8 against the action of spring 9 and increase the resistance 4.

The practical operation of my invention as shown in Fig. 1 is substantially as follows: If we consider the generator running at such speed as to properly charge the battery 31, the switch 12 will be closed and current will flow from the generator through the lead 11, switch 12, lead 13, battery 31, lead 18 and solenoid 19 to the generator. I now so adjust the spring 9 that when the maximum desired current is delivered to the battery, any increase in the said current will cause the core 10 to be drawn downwardly and the resistance 4 increased in such manner that this current will not be exceeded. If now this charging current be delivered to the battery until the voltage thereof rises to the maximum desired to have impressed across the battery, I then adjust the spring 6 so that if this voltage be exceeded across the coil 24, the said coil will cause the lever 5 to be depressed against the action of spring 6 and prevent the generator voltage from being increased above its predetermined limit in a well-known manner. If now the charging of the battery be continued and its voltage rise still farther, this rise will cause the current delivered by the generator to taper off and the regulation of the generator will be automatically carried out by the coil 24 producing a voltage regulated generator throughout speed changes and the maximum voltage desired across the battery will not be exceeded. In some instances with the batteries now in use the rise in battery voltage from the normal to a fully charged state is in the neighborhood of 25 per cent. or even more and it is desired at times to carry the battery charge up to this maximum voltage for various reasons. However, if a load be thrown upon the battery it falls almost immediately from this high voltage to its normal and if a load be carried in multiple with the battery and the battery carried at its highest charged voltage it is obvious that the total load across the battery including any regulating means therefor must be carried at the high voltage of the battery. If the translating circuit is to be operated across the battery when its voltage has fallen to the normal and if the voltage of the battery rise some 25 per cent. at times, there must be some intervening regulator for causing a drop between the battery and generator and the translating devices, which regulator is usually in the form of a variable resistance, dissipating in waste heat this drop between the two circuits which, of course, represents a loss of the amount dissipated and one of the principal objects of my present invention is to minimize this loss and which object may be accomplished in the following manner: When the generator is running as above described and the battery 31 charged until the maximum desired voltage is held across the generator by the coil 24, if the lamps or other translating devices be thrown upon the translating circuit as by closing of the switch 16, I now so adjust the spring 21 that the solenoid 23 will raise the core 22 and increase the resistance 17 so as to lower the voltage across the translation circuit to that which the battery alone is able to supply when in its normal condition, and as this is considerably below that voltage across the highly charged battery there will be considerable drop across the resistance 17. This drop will cause current to flow from the lead 15 through wire 28, coil 27 and wire 26 to the main 18 and this current will tend to assist the coil 24 and thus lower the voltage necessary across the coil 24 to increase the resistance 3 and prevent increase in generator voltage—that is, the current flowing through the coil 27, due to the drop across the resistance 17, will have the effect of readjusting the regulator controlling the resistance 3 so that the same will operate to hold the lower voltage constant across the generator mains throughout speed changes. This will now allow the generator to be voltage regulated but at a voltage lower than when the battery alone was in circuit therewith and, therefore, a considerable of the energy which would be dissipated in heat in the resistance 17, provided the high fully charged voltage were held across the battery 31 and the normal voltage across the translating devices, is avoided in an obvious manner by operating the whole system at a voltage more nearly that of the normal charging voltage of the battery when slightly below its fully charged state. It will be noted that the coil 19 in Fig. 1 is in series with the main generator lead and, therefore, controls the resistance 4 in accordance with the total output of the generator which can not exceed a predetermined limit regardless of how low a voltage will produce this maximum desired current.

In Fig. 2 there is shown a portion of a system similar to the one shown in Fig. 1 with the exception that the coil 19 in the main circuit is replaced by the coil 30 in the battery circuit so that the current flowing to the battery only is that current which controls the resistance 4 in such manner as to prevent an excess regardless of voltage.

Like numerals are used in both figures to indicate corresponding parts and the operation of the modification shown in Fig. 2 may be readily followed from the above description of the operation shown in Fig. 1.

I do not wish in any way to limit myself to details of construction or exact detail of operation set forth in this specification and the drawing thereof which are intended to merely show an embodiment of my invention and from which wide departure may be made without departing from the spirit and scope of my invention which is as set forth in the following claims:

1. The combination with a generator, a main circuit and a translation circuit, of means for regulating the generator responsive to current fluctuations, means for regulating the generator responsive to voltage fluctuations, means for regulating the translation circuit and means for affecting the voltage responsive means affected by the difference in potential across the translation circuit regulator.

2. The combination with a generator and regulating means therefor, means for controlling said regulating means responsive to current fluctuations, means for affecting said regulating means responsive to voltage fluctuations, a translation circuit, a translation circuit regulator and means whereby the degree of operation of said translation circuit regulator affects the voltage responsive means.

3. The combination with a generator and regulating means therefor, means for controlling said regulating means responsive to current fluctuations, means for controlling said regulating means responsive to voltage fluctuations, a translation circuit, a translation circuit regulator and means whereby the operation of said translation circuit regulator adjusts the standard of the voltage responsive means.

4. The combination with a generator and a work circuit, a storage battery and means for controlling the generator responsive to current fluctuations, means for controlling the generator responsive to voltage fluctuations, a translation circuit and a regulator therefor, of means whereby the potential difference caused by the translation circuit regulator affects the voltage responsive means.

5. The combination with a generator, a storage battery and a translation circuit, of means for regulating the generator responsive to voltage fluctuations across the storage battery, a regulator for the translation circuit and means whereby the potential difference across the same affects the voltage regulating means.

6. The combination with a generator, a work circuit, a storage battery and a translation circuit, of means for regulating the generator responsive to voltage fluctuations, means for regulating the generator responsive to current fluctuations, means for regulating the voltage across the translation circuit and means whereby the difference in potential caused by the said translation circuit regulating means adjusts the standard of operation of the voltage responsive means.

JOHN L. CREVELING.

Witnesses:
  CHAS. McC. CHAPMAN,
  ANNA MARIE WALL.

---

Copies of this patent may be obtained for five cents each, by addressing the "Commissioner of Patents, Washington, D. C."